US 11,444,878 B2
Sep. 13, 2022

(12) United States Patent
Lahtiranta et al.

(54) INTELLIGENT DATAFLOW-BASED SERVICE DISCOVERY AND ANALYSIS

(71) Applicant: YAHOO AD TECH LLC, Dulles, VA (US)

(72) Inventors: Atte Lahtiranta, Los Altos, CA (US); Matti Oikarinen, Los Altos, CA (US)

(73) Assignee: YAHOO AD TECH LLC, Dulles, VA (US)

( * ) Notice: Subject to any disclaimer, the term of this patent is extended or adjusted under 35 U.S.C. 154(b) by 50 days.

(21) Appl. No.: 16/560,002

(22) Filed: Sep. 4, 2019

(65) Prior Publication Data
US 2021/0067455 A1 Mar. 4, 2021

(51) Int. Cl.
| | |
|---|---|
| H04L 47/2483 | (2022.01) |
| H04L 9/40 | (2022.01) |
| H04L 67/51 | (2022.01) |
| H04L 47/2441 | (2022.01) |
| G06N 20/00 | (2019.01) |

(52) U.S. Cl.
CPC ......... H04L 47/2483 (2013.01); G06N 20/00 (2019.01); H04L 47/2441 (2013.01); H04L 63/166 (2013.01); H04L 67/51 (2022.05); H04L 63/0428 (2013.01)

(58) Field of Classification Search
CPC ............. H04L 47/2483; H04L 47/2441; H04L 63/0428; G06N 20/00
See application file for complete search history.

(56) References Cited

U.S. PATENT DOCUMENTS

| | | | | |
|---|---|---|---|---|
| 8,898,784 B1* | 11/2014 | Alexander | .......... | H04L 63/1408 726/23 |
| 9,614,670 B1* | 4/2017 | Ghetti | ................ | H04L 63/0428 |
| 9,906,511 B1* | 2/2018 | Kolman | ................ | H04L 9/3242 |
| 10,311,372 B1* | 6/2019 | Hotchkies | ............... | H04L 67/32 |
| 10,579,658 B2* | 3/2020 | Freilinger | ............. | G06F 16/337 |
| 10,805,338 B2* | 10/2020 | Kohout | ............... | H04L 41/0686 |
| 2005/0256923 A1* | 11/2005 | Adachi | .................... | G06F 9/452 709/203 |
| 2006/0029016 A1* | 2/2006 | Peles | ...................... | H04L 69/16 370/328 |

(Continued)

OTHER PUBLICATIONS

Hanoka, "Generic Construction of Chosen Ciphertext Secure Proxy Re-Encryption", Springer, 2012.*

(Continued)

*Primary Examiner* — Todd L Barker
(74) *Attorney, Agent, or Firm* — James J. DeCarlo

(57) ABSTRACT

The disclosed embodiments are directed toward monitoring and classifying encrypted network traffic. In one embodiment, a method is disclosed comprising intercepting an encrypted network request, the network request transmitted by a client device to a network endpoint; identifying a network service associated with the network endpoint based on unencrypted properties of the encrypted network request; identifying, based on the encrypted network request and a series of subsequent network requests issued by the client device, an action taken by the client device, the action comprising an activity performed during a session established with the network service; and updating a catalog of network interactions using the network service and the action.

20 Claims, 5 Drawing Sheets

(56) References Cited

U.S. PATENT DOCUMENTS

| | | | | |
|---|---|---|---|---|
| 2007/0076599 | A1* | 4/2007 | Ayyagari | H04L 47/803 370/229 |
| 2015/0312352 | A1* | 10/2015 | Shamilian | H04L 69/30 726/6 |
| 2016/0337320 | A1* | 11/2016 | Mason | G06F 16/9566 |
| 2017/0093920 | A1* | 3/2017 | Ducatel | H04L 63/08 |
| 2018/0268304 | A1* | 9/2018 | Manadhata | G06N 5/04 |
| 2018/0307748 | A1* | 10/2018 | Freilinger | G06F 16/337 |
| 2019/0014136 | A1* | 1/2019 | Ahn | H04L 63/0281 |
| 2019/0068474 | A1* | 2/2019 | Vasseur | H04L 69/329 |
| 2019/0245866 | A1* | 8/2019 | Anderson | H04L 63/166 |
| 2020/0177564 | A1* | 6/2020 | Arisankala | H04L 67/141 |
| 2020/0280584 | A1* | 9/2020 | Zhao | H04L 29/06 |
| 2020/0313903 | A1* | 10/2020 | Yu | H04L 9/14 |
| 2021/0067337 | A1* | 3/2021 | Bahrami | H04L 9/06 |

OTHER PUBLICATIONS

Wang et al, "Integration of Networking, Caching, and Computing in Wireless Systems:: A Survey, Some Research Issues, and Challenges", IEEE Communications Surveys & Tutorials, vol. 20, No. 1, First Quarter 2018.*

Aslett et al., "A review of homomorphic encryption and software tools for encrypted stastical machine learning", Aug. 26, 2015.*

Saeed et al., "Intelligent Intrusion Detection in Low-Power IoTs", ACM Transactions on Internet Technology, vol. 16, Issue 4, Dec. 2016, ACM Publishing.*

* cited by examiner

INTELLIGENT DATAFLOW-BASED SERVICE DISCOVERY AND ANALYSIS

COPYRIGHT NOTICE

This application includes material that is subject to copyright protection. The copyright owner has no objection to the facsimile reproduction by anyone of the patent disclosure, as it appears in the Patent and Trademark Office files or records, but otherwise reserves all copyright rights whatsoever.

TECHNICAL FIELD

The disclosed embodiments are directed to the field of computer network traffic analysis and, more particularly, to identifying network service usage despite the use of encrypted communications protocols.

BACKGROUND

Historically, an Internet service provider (ISP) and other parties who have access to a user's data stream (e.g., network requests) have analyzed datagrams of this stream to determine what network services users use. With the introduction and widespread adoption of encrypted connections via transport layer security (TLS) and secure sockets layer (SSL) (TLS/SSL) protocols, ISPs were unable to simply inspect network datagrams as the datagrams were encrypted and thus unreadable.

In response, ISPs began inspecting domain name system (DNS) resolution queries as an alternative means to assign network activity to specific network services. By inspecting DNS name resolutions, ISPs could identify the Internet Protocol (IP) associated with a network request which could then be used to roughly assign a network request to a given network service. However, as cloud computing and distributed computing became more prevalent, many different network services were frequently serviced by a single IP address of a given infrastructure-as-a-service (IaaS) provider. Thus, it became impossible to classify network requests based solely on destination IP addresses. Relatedly, ISPs frequently inspected DNS queries to determine host names associated with network requests which solved some of the problem of many network services being provided by a single IaaS IP space. However, the introduction of encrypted DNS queries (e.g., DNS over TLS or DNS Crypt) prevented ISPs from inspecting these DNS queries as encounter, similarly, in the introduction of TLS/SSL discussed above.

Currently, there is a significant push to ensure encryption of all aspects of network communications, thus the above problems have rendered most techniques for identifying network service usages obsolete. The disclosed embodiments below solve these and other problems faced by ISPs and other network operators.

SUMMARY

The disclosed embodiments describe a set of techniques that can be utilized to classify network transactions despite these transactions being encrypted. Examples of such transaction include Secure Hypertext Transfer Protocol (HTTPS) requests, lower-level transmission control protocol (TCP) requests, DNS queries, and any other potentially encrypted requests and responses. The disclosed embodiments can be implemented by an ISP provider, a virtual private network (VPN) provider, or generally any network operator that has access to encrypted network requests.

At a high level, five core techniques (and variations thereof) are described. First, the disclosed embodiments describe a technique for extracting a domain and host from an encrypted network request by identifying leaked data during a TLS handshake. Second, the disclosed embodiments describe techniques for modeling network transactions to generate a fingerprint of a given transaction which can be used (for example, in combination with TLS leakage extraction) to classify transactions. Third, a mapping between IP addresses and services can be created and updated for quickly classifying network requests. Fourth, a mapping between response sizes, response times, network routes, and other aspects of a request and services can be created and updated for quickly classifying network requests. Fifth, uniform resource identifier (URI) headers can be modeled for quickly classifying network requests.

Various combinations of these techniques can be used to classify network transactions without accessing the plaintext content of the requests. These combinations are difficult to circumvent as they combine industry standards (e.g., a TLS handshake), data probability (e.g., type of packets, target IP addresses, payload size, timing), point-in-time discovery (checking IP addresses of top sites with reverse DNS), and other factors etc. Thus, the combinations can reliably identify network services used by users even when DNS is encrypted and TLS/SSL are in use.

In one embodiment, a method is disclosed comprising intercepting an encrypted network request, the network request transmitted by a client device to a network endpoint; identifying a network service associated with the network endpoint based on unencrypted properties of the encrypted network request; identifying, based on the encrypted network request and a series of subsequent network requests issued by the client device, an action taken by the client device, the action comprising an activity performed during a session established with the network service; and updating a catalog of network interactions using the network service and the action.

In another embodiment, a non-transitory computer readable storage medium for tangibly storing computer program instructions capable of being executed by a computer processor is disclosed, the computer program instructions defining the steps of: intercepting an encrypted network request, the network request transmitted by a client device to a network endpoint; identifying a network service associated with the network endpoint based on unencrypted properties of the encrypted network request; identifying, based on the encrypted network request and a series of subsequent network requests issued by the client device, an action taken by the client device, the action comprising an activity performed during a session established with the network service; and updating a catalog of network interactions using the network service and the action.

In another embodiment, a device is disclosed comprising a processor; and a storage medium for tangibly storing thereon program logic for execution by the processor, the stored program logic causing the processor to perform the operations of: intercepting an encrypted network request, the network request transmitted by a client device to a network endpoint, identifying a network service associated with the network endpoint based on unencrypted properties of the encrypted network request, identifying, based on the encrypted network request and a series of subsequent network requests issued by the client device, an action taken by the client device, the action comprising an activity performed during a session established with the network service, and updating a catalog of network interactions using the network service and the action.

The resulting data can then be used for generating network utilization insights, behavioral targeting, personalization, and monetization. Further, the resulting data can also be used to determine hacked Internet of things (IoT) devices and backdoored components connecting to control servers etc. Specifically, the disclosed embodiments can detect anomalous access to services that are unexpected (e.g., IoT thermostats access unknown IP addresses or IP address not controlled by the thermostat manufacturer).

DETAILED DESCRIPTION

Figure 1:
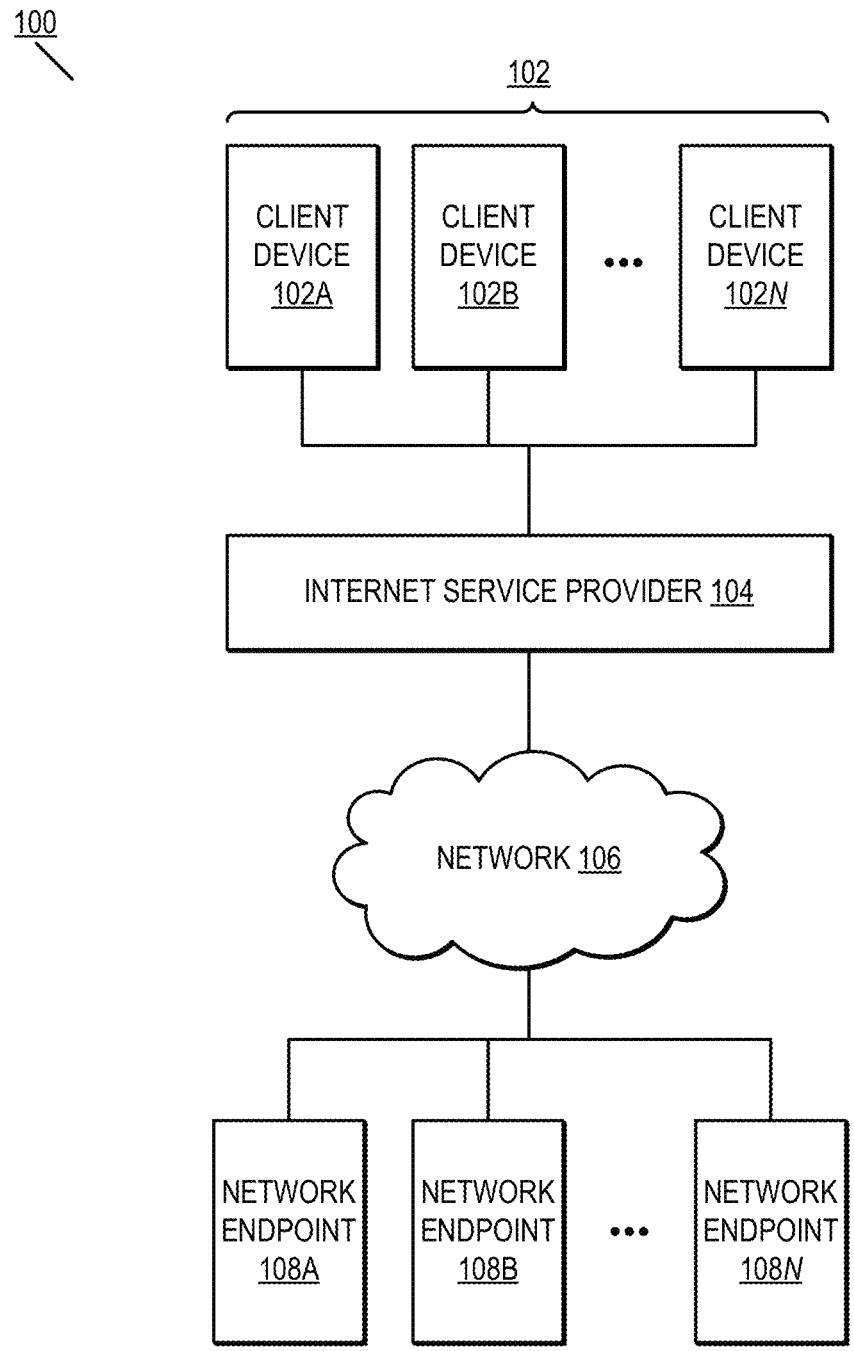
FIG. 1 is a block diagram illustrating a network environment according to some embodiments of the disclosure.

The present disclosure will now be described more fully hereinafter with reference to the accompanying drawings, which form a part hereof, and which show, by way of non-limiting illustration, certain example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein, depending at least in part upon context, may be used to describe any feature, structure, or characteristic in a singular sense or may be used to describe combinations of features, structures, or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure is described below with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general-purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

For the purposes of this disclosure a non-transitory computer readable medium (or computer-readable storage medium/media) stores computer data, which data can include computer program code (or computer-executable instructions) that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable, and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid-state memory technology, CD-ROM, DVD, or other optical storage, cloud storage, magnetic cassettes, magnetic tape, magnetic disk storage or other magnetic storage devices, or any other physical or material medium which can be used to tangibly store the desired information or data or instructions and which can be accessed by a computer or processor.

For the purposes of this disclosure the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud servers are examples.

For the purposes of this disclosure a "network" should be understood to refer to a network that may couple devices so that communications may be exchanged, such as between a server and a client device or other types of devices, including between wireless devices coupled via a wireless network, for example. A network may also include mass storage, such as network attached storage (NAS), a storage area network (SAN), a content delivery network (CDN) or other forms of computer or machine-readable media, for example. A network may include the Internet, one or more local area networks (LANs), one or more wide area networks (WANs), wire-line type connections, wireless type connections, cellular or any combination thereof. Likewise, sub-networks, which may employ differing architectures or may be compliant or compatible with differing protocols, may interoperate within a larger network.

For purposes of this disclosure, a "wireless network" should be understood to couple client devices with a network. A wireless network may employ stand-alone ad-hoc networks, mesh networks, Wireless LAN (WLAN) networks, cellular networks, or the like. A wireless network may further employ a plurality of network access technologies, including Wi-Fi, Long Term Evolution (LTE), WLAN, Wireless Router (WR) mesh, or 2nd, 3rd, 4th or 5th generation (2G, 3G, 4G or 5G) cellular technology, Bluetooth, 802.11b/g/n, or the like. Network access technologies may enable wide area coverage for devices, such as client devices with varying degrees of mobility, for example.

In short, a wireless network may include virtually any type of wireless communication mechanism by which signals may be communicated between devices, such as a client device or a computing device, between or within a network, or the like.

A computing device can send or receive signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like.

For purposes of this disclosure, a client (or consumer or user) device may include a computing device capable of sending or receiving signals, such as via a wired or a wireless network. A client device may, for example, include a desktop computer or a portable device, such as a cellular telephone, a smart phone, a display pager, a radio frequency (RF) device, an infrared (IR) device an Near Field Communication (NFC) device, a Personal Digital Assistant (PDA), a handheld computer, a tablet computer, a phablet, a laptop computer, a set top box, a wearable computer, smart watch, an integrated or distributed device combining various features, such as features of the forgoing devices, or the like.

A client device may vary in terms of capabilities or features. Claimed subject matter is intended to cover a wide range of potential variations, such as a web-enabled client device or previously mentioned devices may include a high-resolution screen (HD or 4K for example), one or more physical or virtual keyboards, mass storage, one or more accelerometers, one or more gyroscopes, global positioning system (GPS) or other location-identifying type capability, or a display with a high degree of functionality, such as a touch-sensitive color 2D or 3D display, for example.

FIG. 1 is a block diagram illustrating a network environment according to some embodiments of the disclosure.

The illustrated network environment (100) includes a plurality of client devices (102*a*, 102*b*, 102*n*; collectively, 102) communicatively coupled to an ISP (104). The client devices (102) communicate with network endpoints (108*a*, 108*b*, 108*n*; collectively, 108) via the ISP (104) and over a network (106). FIG. 1 shows components of one network environment in which the systems and methods discussed herein may be practiced. Not all the components may be required to practice the disclosure, and variations in the arrangement and type of the components may be made without departing from the spirit or scope of the disclosure.

Client devices (102) can include any type of computing device that issues network requests. For example, client devices (102) includes personal computing devices, mobile devices, tablets, desktop computers, video game consoles, smart watches, and other consumer electronic devices. Client devices (102) also includes IoT and machine-to-machine devices such as thermostats, door locks, and other semi-autonomous devices. Client devices (102) may also include autonomous vehicles such as automobiles, drones, and other devices. Client devices (102) in some embodiments may also include server devices. As used herein, a server device in the context of client devices (102) refers to a server issuing network requests (versus endpoints which receive and response to such requests). The foregoing is meant to provide examples of the types of client devices (102) operable in the environment (100). Generally, any device that issues network requests (e.g., HTTPS or TCP requests) may comprise a client device.

As illustrated, client devices (102) are communicatively coupled to an ISP (104). Although the ISP (104) is illustrated as a single component, an ISP (104) generally includes many computing devices, networks, and other components and the ISP (104) is illustrated as a single component only to ease discussion. The ISP (104) can comprise a wired ISP (e.g., a cable or fiber ISP) or a wireless ISP (e.g., a cellular or satellite ISP). In general, the ISP (104) receives network requests from the client devices (102). Such requests can be, and often are, encrypted using TLS/SSL (references to TLS also refer to SSL when appropriate). The requests can comprise HTTPS requests, DNS queries, and any other type of network request. ISP (102) routes these requests to an appropriate endpoint (108) over network (106). As will be described in more detail herein, ISP (104) can additionally analyze the requests to associate or assign the requests to one or more known network services.

In the illustrated embodiment, network (106) comprises an internet; that is, a network of networks and is not limited to a single network, a single network type, or single network topology. In general, however, network (106) is generally a wide area network (WAN). As illustrated, network (106) may be separate from ISP (104) and may be provided by multiple other network operators (e.g., long-haul lines, other ISPs etc.). In some embodiments, the network (106) can be provided by the ISP (104) itself. For example, a given network endpoint and a client device may both be customers of the ISP and thus all communications may travel within a network owned and operated by the ISP.

Multiple network endpoints (108) are connected to the network (106). Although not illustrated, each of these network endpoints (108) can comprise client devices or server devices. As used herein, a server device refers to a networked computing device that responds to network requests issued by client devices (102). The network endpoints (108) can comprise application servers, DNS resolvers, and generally any device providing a network service on the network (106). In some embodiments, network endpoints (108) are connected to the network (106) via separate ISPs (not illustrated). Alternatively, or in conjunction with the foregoing, network endpoints (106) can be connected to the network (106) via a network proxy, VPN, or other enterprise network element. In some embodiments, such a proxy, VPN, or network element can implement the same methods described herein with respect to the ISP (104).

In previous systems, network traffic between client devices (102) and endpoints (108) is encrypted end-to-end (E2E). In these systems, the role of ISP (104) is to ferry packets between the client devices (102) and endpoints (108). The ISP (104) is generally unable to decrypt the packets as they pass through its network elements. Further, since many services are hosted on single IP addresses, the unencrypted portions of the datagrams are of minimal use beyond classifying traffic to given IaaS providers. Thus, the ISP (104) can glean no insight into the activity that client devices (102) and endpoints (108) are engaged in. The following methods may be implemented alone or in combination by the ISP (104) to assign network transactions to network services.

Figure 2:
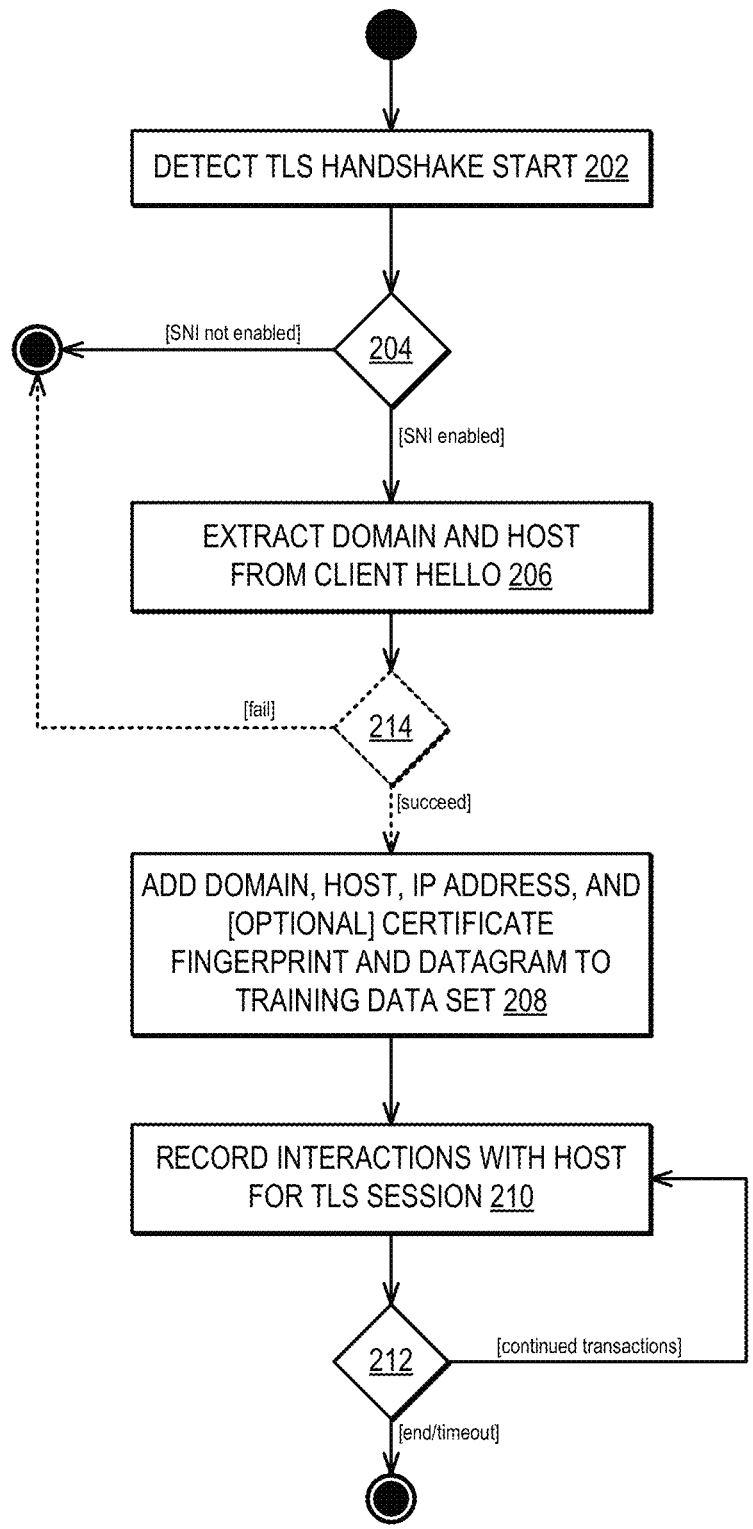
FIG. 2 is a flow diagram illustrating a method for associating encrypted network requests with hosts according to some embodiments of the disclosure.

FIG. 2 is a flow diagram illustrating a method for associating encrypted network requests with hosts according to some embodiments of the disclosure. The illustrated embodiment depicts techniques for classifying network requests by hostnames even when such requests are encrypted using TLS. The method accomplishes this by extracting host and domain data from a TLS handshake that utilizes the sever name identification (SNI) extension of TLS.

In block 202, the method detects the start of a TLS handshake. Generally, a TLS handshake includes multiple network interactions between a client and server. The specifics of a handshake vary depending on the key exchange algorithm used and the cipher suites supported by the client and the server. In all scenarios however, a client issues a "client hello" message to initiate the handshake. The client hello message includes various fields such as a TLS protocol version, session ID, random string, cipher suite listing, compression method, and zero or more extensions. As illustrated, this client hello message is used to detect the start of a TLS handshake. Thus, the method can identify a TLS handshake by matching the form of the TLS client hello to network requests received.

In block 204, the method determines if SNI is enabled in the client hello. In one embodiment, extensions in the client hello are transmitted in plaintext. Thus, in block 204 the method can analyze the plaintext of the client hello and determine if the SNI extension is present. If no SNI extension is present, the method ends since the hostname cannot be extracted via the extension. In generally, nearly all clients support SNI and thus, it will be rare (but possible) that block 204 will fail. However, for malicious clients SNI may potentially not be implemented. This results in malicious traffic being excluded from traffic modeling which increases the utility of the results discussed in more detail herein.

In block 206, the method extracts a domain and host from the client hello message. Specifically, the method analyzes the datagram comprising the TLS client hello and identifies the start of the SNI extension. The method can then use pattern matching to extract a host (e.g., example) and domain (e.g., .com) included in the SNI extension. In some embodiments, the method concatenates these values to form the domain name of the client hello.

In optional block 214, the method verifies that the TLS handshake succeeds. In some circumstances, the domain name included in the SNI extension may not be recognized by the endpoint. In this case, the domain name is of limited value for modeling traffic since it represents a failed transaction. Thus, in some embodiments, the method monitors the remaining transactions in the TLS handshake to confirm that the handshake succeeds, which indicates that the domain name was valid. In other embodiments, the method bypasses block 214 and simply records the existing of a request to the extracted domain name.

In block 208, the method adds the extracted domain and host to a training set. Additionally, the method may add the IP address, a fingerprint of the server's certificate, and the entire request datagram to the training data set. These items may be associated as a tuple for later processing. This processing is described more fully in other figures. In general, the method uses the domain and host as a label and the remaining data as a payload. In this manner, the method generates a training data set of labeled examples that can be used to train a machine learning model (e.g., classifier) alone or in conjunction with other methods described herein.

In block 210, the method records interactions with the extracted host for a given TLS session. In block 212, the method determines if the client continues to issue requests for a given TLS session. If so, the method continues to record interactions with the host for the session (block 210). Upon detecting a timeout or a session teardown, the method ends.

In some embodiments, the method monitors sessions of clients with a given host after the TLS handshake succeeds. Each datagram in the session is used to refine the training data set generated in block 208. Thus, in some embodiments, each datagram is labeled as described in block 208. An example of this operation (and previous operations) is provided below with respect to an email server.

In the client hello, the method identifies an IP address of 3.3.3.3 and a domain name (host and domain) as mail.example.com. The method records this data as an initial training example. While the client is connected to mail.example.com, the client will issue numerous requests to the server. For example, the client will issue an initial request to mail.example.com to load an inbox and the server returns a lengthy response. The client may then issue a GET request for a single email, to which the server returns a smaller response body. The client may then issue a POST request with a significant data payload to send a reply to the message. The server may then reply with an HTTP 200 message and no body. With TLS enabled, existing systems were unable to classify these transactions to a given host. However, in the illustrated method, each request can be tagged as belonging to a given host.

Figure 3:
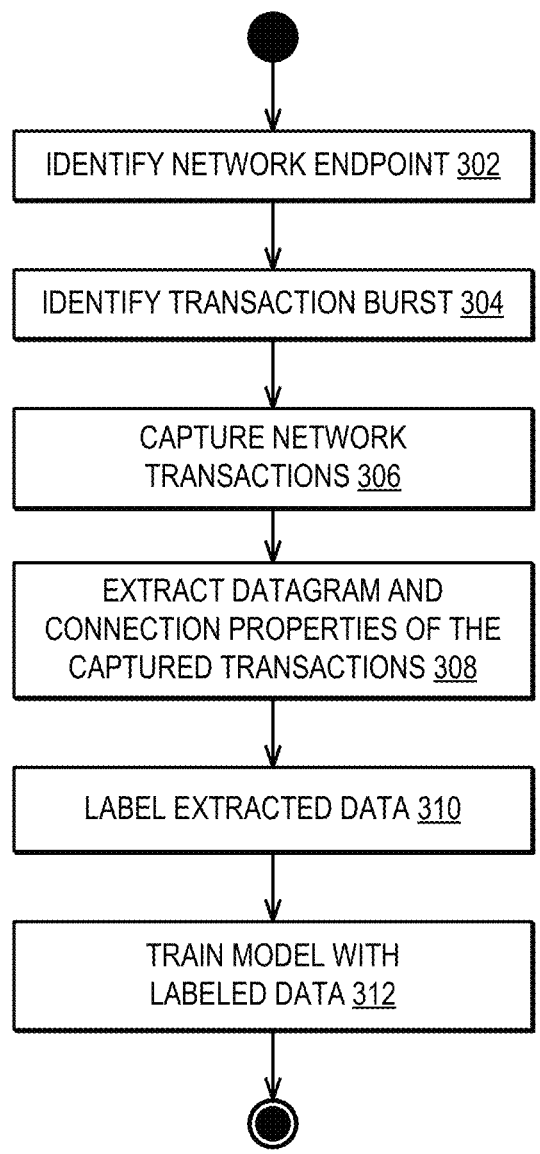
FIG. 3 is a flow diagram illustrating a method for datagram and connection modeling according to some embodiments of the disclosure.

FIG. 3 is a flow diagram illustrating a method for datagram and connection modeling according to some embodiments of the disclosure. The illustrated method depicts embodiments for modeling network transactions to generate fingerprints of data types and request patterns associated with a given endpoint. The fingerprints are formed based on metadata and do not rely upon identifying information (either personal or connection) to generate a fingerprint.

In block 302, the method identifies an endpoint for a given set of network transactions.

In one embodiment, the method described in FIG. 2 can be used to identify the endpoint. In an alternative embodiment, the method can identify endpoints by simulating network traffic with known clients. In this embodiment, the method utilizes one or more client devices to issue network requests to known endpoints. Since the method is controlling the client devices, the method can label the resulting request/response pairs reliably. In this manner, the method can generate a training set without relying on TLS handshake leakage as described in FIG. 2.

In block 304, the method identifies a transaction burst.

During normal network interactions, transactions are generally issued in short "bursts" of multiple transactions followed by a relatively longer period of inactivity. For example, when requesting a web page comprising an email inbox the initial request will include many additional requests for assets and other resources. These requests will be issued immediately after one another and generally in a matter of seconds (or quicker depending on network latency). After this initial "burst" of activity, the session remains relatively silent for a significantly longer period (e.g., 20 seconds, 1 minute, etc.). When a user performs a second action (e.g., selecting an email), a similar burst of transactions is initiated again finishing in a short amount of time. This process is repeated generally for each interaction. Thus, in block 304, the method detects the start of these bursts to determine when to begin grouping network transactions into a user interaction.

In block 306, the method captures network transactions associated with the transaction burst.

In one embodiment, the method can monitor a session for inactivity. The method can then monitor transactions to determine when multiple transactions are issued is rapid succession. This process can avoid capturing heartbeat interactions or other intermittent requests issued by clients. Upon detecting that a threshold number of transactions were issued, the method can group the issued transactions and future transactions into a grouping of transactions for modeling.

In block 308, the method analyzes the captured network transactions and extracts datagram and connection properties of the requests and responses. Various properties can be extracted, some of which are described below. The various examples can be used independently or, more commonly, in varying permutations.

In one embodiment, TCP port numbers can be extracted from network requests. In general, TCP port numbers are semi-deterministic and thus can be used to fingerprint the requests within a given transaction burst.

In one embodiment, the IP address space in the network requests can be used to identify a company providing the network service. In general, IP address spaces are static and can thus be used to preliminarily assign a given set of network requests to a given company based on this IP address space.

In one embodiment, the size of the datagrams in both the requests and responses can be extracted and used for fingerprinting. Generally, datagram size is variable and not a strong independent indicator of a network service identifier. However, when providing (for example) static assets, a given network service will frequently transmit identically sized assets (and thus datagram sizes) during transactions bursts.

In one embodiment, the response time of a given transaction can be used to fingerprint the transaction. In some embodiments, since the response time varies based on network latency, the trace route to the target IP address (i.e., network service IP address) can be used to normalize the response time to obtain a normalized response time for each of the network requests. In some embodiments, the total response time for a transaction burst can be used as the response time (i.e., the time between the first and last transaction) can be used.

In one embodiment, the number of requests in the transaction burst can be used to fingerprint the transaction burst. For example, certain types of burst will tend to have a similar (or identical) number of transactions, thus this number can be used as one signal to fingerprint the burst. Additionally, the ordering of these transactions can be used as another fingerprinting signal. As one example, an HTML page generally includes a fixed or semi-fixed structure which defines how a client will retrieve external assets (e.g., stylesheets, JavaScript, etc.). Thus, the ordering of requests is semi-deterministic and can be used as a fingerprint. The destination IP address, size of the request/response, and timing can all be used in the ordering to fingerprint the transaction burst.

Finally, in one embodiment, network route tracing can be used to fingerprint a given transaction burst. In this embodiment, the method can trace the destination IP addresses between the client and the endpoint and identify, for each IP address in the route, the companies involved in the route. For example, many large companies own their own datacenters and thus many "hops" on the trace route will include identifying data (e.g., a hostname) that clearly identify the provider of the ultimate network service.

The various signals described above can all be used to form a fingerprint of a given transaction burst. The disclosed embodiments are not limited to a specific combination and any permutation of the above signals may be utilized to fingerprint a transaction burst.

In block 310, the method labels the extracted data. In some embodiments (described below), this labelling is optional or partially optional.

As discussed, the output of the method in FIG. 3 is a trained model that can be used to classify future extracted data. In one embodiment, the method trains a classifier and thus requires labeled data. In this example (i.e., a supervised learning model), the labeled data can be generated by performing the above process with a known client device. That is, bots or scripts can be used to simulate network activity with various services. In other embodiments, users who opt-in to training a system can be used to perform the same actions. In either embodiment, the method knows in advance what the transaction burst is associated with (both a network service as well as the type of action taken). For example, a script can be configured to login to an email client (burst #1), select an email (burst #2), respond to the email (burst #3), and create and send a new email (burst #4). Since the method controls the operation of the bot/script, the method can apply appropriate labels to the recorded burst data in block 310.

In some embodiments, unsupervised learning methods can be used to cluster transaction bursts. In these embodiments, the method may cluster transactions bursts for a given network service. For example, the four bursts described above would generally be capable of being clustered into four separate groups. After this clustering, the properties of the aggregate clusters may be analyzed to label the clusters and thus individual transactions. For example, a large request datagram size for bursts #3 and #4 can be used as evidence that these bursts are associated with sending email. Further, fewer requests/responses in burst #2 as compared to burst #1 can be evidence that burst #2 is associated with reading an individual email. Finally, the ordering of bursts can be used as evidence that burst #1 is indicative of an initial burst (i.e., loading an inbox).

As another example, the above fingerprinting can be used to identify individual content items provided by network services. Each content item on a website has different pictures, descriptions of different lengths, etc. If a first user downloads the product image, the response size over an HTTPS connection is same as a second (or third, etc.) user. Even with larger collections of content items, a 1000-byte variance in image sizes reduces the potential set of candidate content viewed by the user. This pruning of options, combined with the other signals described above, increases the confidence level of identifying an individual content item. Thus, a bot/script can be used to identify and label images and the combination of image sizes, datagram sizes, and other signals can be used to identify future unlabeled requests on a content item-level basis.

Using these approaches, the method generates a training data set that comprises a set of n-dimensional transaction burst vectors, each labeled with a tuple comprising the network service and, if available, an action performed with respect to the service. In some embodiments, the method utilizes fingerprints instead of raw data organized as vectors. In this scenario, the method may perform various operations on the underlying data (e.g., hashing, etc.) to generate the fingerprint. In other embodiments, the raw vectorized data can comprise the fingerprint itself.

In block 312, the method then trains a model using the labeled data. In the illustrated embodiment, any suitable type of supervised learning model may be used to generate the model. For example, a support vector machine (SVM) model or neural network may be used to generate the resulting model based on the extracted training data. Alternatively, decision trees or similar methods can be used to generate the model.

In one embodiment, models (or model layers) may be shared or re-used across network services. For example, multiple network services may provide email or e-commerce services. Despite comprising different network services, these categories generally perform similar actions (e.g., sending and reading email or viewing products and completing a purchase). Thus, in some embodiments, the models generated in FIG. 3 can be created for a known service (e.g., YAHOO MAIL) and then applied to an unknown network service of the same type (e.g., GMAIL). In this manner, the method can utilize a bot or script on a single service and extrapolate the model to other similar services without negatively impacting the operation of the similar services.

Figure 4:
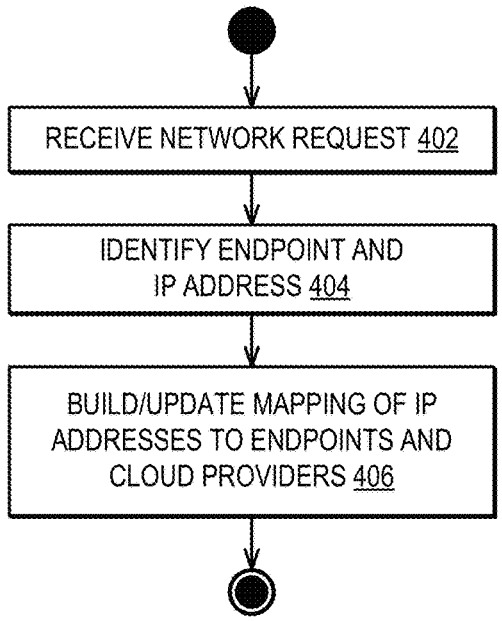
FIG. 4 is a flow diagram illustrating a method for building an IP to network service mapping based on monitored network requests according to some embodiments of the disclosure.

FIG. 4 is a flow diagram illustrating a method for building an IP to network service mapping based on monitored network requests according to some embodiments of the disclosure.

In block 402, the method receives a network request. Details of network requests have been described previously and are not repeated herein for the sake of clarity.

In block 404, the method identifies an endpoint and an IP address associated with the network request.

In one embodiment, the method identifies an IP address of the network request by extracting it from the IP header of the network request. In one embodiment, identifying the endpoint of the request comprises identifying a network service associated with the IP address. In some embodiments, this can be done by employing the methods described in the description of FIG. 2. Alternatively, in some embodiments, the method may utilize the trained model described in the description of FIG. 3. In either event, the method identifies the IP address and an identifier of the network service.

In some embodiments, the method may further predict the action taken with respect to the network service. In these embodiment, the method can also employ the predictive models generated in FIG. 3.

In block 406, the method generates a mapping of IP addresses to endpoints.

In some embodiments, this mapping can also include a mapping from IP addresses to both endpoints (network services) and actions taken with respect to these network services. In some embodiments, the method may record additional data such as the frequency in which the network services (and actions) are accessed, the location of client devices, the most recent access, and various other metrics.

In some embodiments the method further stores in the mapping an identification of the cloud service provider. In general, cloud service (IaaS) providers (e.g., GOOGLE CLOUD, AMAZON AWS, and MICROSOFT AZURE) host many different network services within a single address space. As described above, simply looking at an IP address thus does not provide any insight into the individual networks services in use on those IaaS platforms. In one embodiment, by storing the cloud provider associated with an IP address, the method can create a mapping not only of IP addresses to individual network services, but also a mapping of network services to cloud service providers.

In some embodiments, the method depicted in FIG. 4 can be executed in real-time. That is, block 406 can be executed for every request on the network. In this manner, the method can provide a real-time mapping of network services and their cloud service providers. This mapping can then be used to quickly classify future network requests. For example, in some embodiments, the mapping can be used to identify IP address spaces for given network services and this mapping can be used to classify incoming requests to IP addresses within this address space. Thus, the method in FIG. 4 can be utilized identify network endpoints in, for example, block 302 of FIG. 3.

Figure 5:
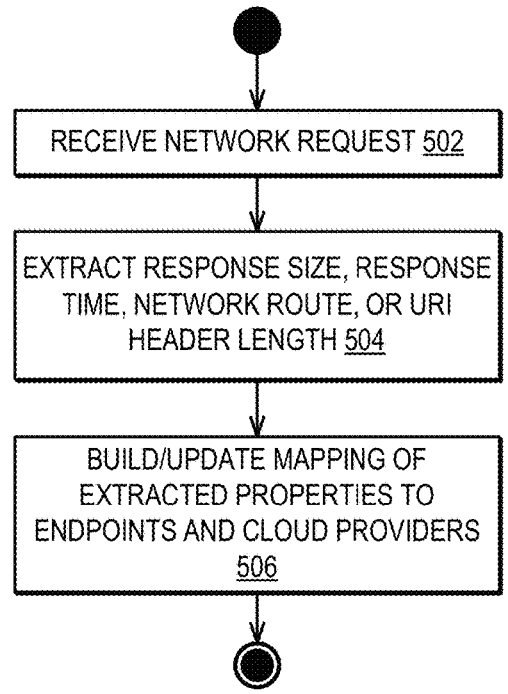
FIG. 5 is a flow diagram illustrating a method for building a mapping of network transaction properties to network services according to some embodiments of the disclosure.

FIG. 5 is a flow diagram illustrating a method for building a mapping of network transaction properties to network services according to some embodiments of the disclosure.

In block 502, the method receives a network request. Details of network requests have been described previously and are not repeated herein for the sake of clarity.

In block 504, the method extracts a response size, response time, network route, URI header length, or combination thereof from the network request. In some embodiments, the method may extract various other parameters of the network request (e.g., datagram size, TCP port, etc.) discussed above as part of block 504.

In block 506, the method builds or updates a mapping of the extracted properties to endpoints and cloud providers.

The illustrated method in FIG. 5 is similar to that in FIG. 4 and the details of FIG. 4 are not repeated herein for FIG. 5. Generally, the method in FIG. 5 generates mapping of various properties of the network requests (beyond IP addresses) that can be used to classify future requests without knowing the IP address of a response.

In some embodiments, the various properties extracted in block 504 are used to create per-property mappings. That is, the method creates a response size to endpoint mapping, a response time to endpoint mapping, etc. In this manner, the mappings can be used in a cascading fashion to classify network requests. This cascading may be useful to narrow down a list of potential endpoints based solely on network request properties.

For example, when receiving a network request the method may first identify a set of 1000 endpoints that have similar response sizes. In some embodiments, the method may perform a "fuzzy" match, in that an exact response size match is not required (due to fluctuations in data transmitted). The method can then identify a second set of 750 endpoints that (fuzzily) match the URI header length. The method can then identify the intersection of these sets and use the intersection as a candidate set of network services for further inspection. In some embodiments, this intersection may comprise a single network service. In this case, the method can assume the network request is associated with the network service.

In other embodiments, the intersection may comprise multiple network services. In this embodiment, the method may utilize the predictive models described in FIG. 3 to make a final determination as to the network service. Thus, the process in FIGS. 4 and 5 can be used to refine the confidence of the model output of FIG. 3.

Figure 6:
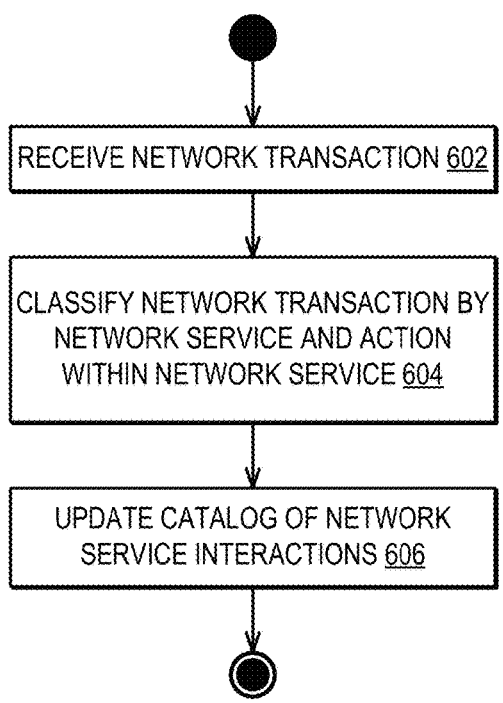
FIG. 6 is a flow diagram illustrating a method for classifying network transactions according to some embodiments of the disclosure.

FIG. 6 is a flow diagram illustrating a method for classifying network transactions according to some embodiments of the disclosure.

In block 602, the method receives a network transaction.

In one embodiment, the network transaction comprises a network request, response, or both. In some embodiments, block 602 further comprises receiving a transaction burst as described in FIG. 3.

In block 604, the method classifies the network transaction by network service and action within that network service. That is, the method identifies a network service for the network transaction and, if possible, identifies an action taken by the client with the network service.

The preceding methods in FIGS. 3 through 5 may be used alone or in any permutation to performed block 604. Various non-limiting examples are given herein below.

In one embodiment, the methods in FIG. 2 can be used alone in block 604. In this scenario, the method can classify network requests based on an associated hostname and thus network service.

In another embodiment, the methods in FIG. 3 can be used alone in block 604. In this embodiment, the pretrained model is used to predict the network service and actions taken thereon by inputting the transaction into the model. In another embodiment, the methods in FIGS. 2 and 3 can be combined. In this embodiment, the method may first identify a hostname using the method in FIG. 2 and use this hostname as an input to the model generated in FIG. 3. In this manner, the output of the model is further refined given the explicitly identification of a hostname.

In another embodiment, FIG. 2 or 3 can be combined with FIG. 4 or 5. In these embodiments, the method can identify a network service (using the methods in FIGS. 2 and 3). The method can then execute the methods in FIG. 4 or 5 to associate an IP address or request property (respectively) with the identified network service.

In block 606, the method updates a catalog of network service interactions.

In one embodiment, the operator of the method may maintain a database of interactions with network service (in addition to the mapping tables described above). This database can be used for downstream analytics, personalization, marketing, and various other purposes.

As one example, the database can be used to increase a quality of service for specific network services and actions taken thereon on a per-client basis. Thus, if the database indicates that a given client device users certain network services more than others, an ISP operating the method can increase the throughput for that client and those services while reducing the throughput for other services.

As another example, the database can be used to obtain a holistic picture of how an ISP's users are accessing network services. This picture can be used by network engineers to improve packet handling to these network services.

In another embodiment, an ISP operating the method can share the data with the network services themselves such that the network services can improve services for users.

As another example, the database can be used to identify clients that are acting maliciously. For example, clients can be identified by MAC addresses which can in turn be used to classify devices as client devices, IoT devices, control servers, etc. The network service access by these devices can then be examined to identify malicious acts. For example, if a smart thermostat is sending large amount of email, or accessing inappropriate sites, it may indicate that the device was compromised and is acting as part of a botnet.

As another example, in one embodiment, the methods can be used to identify purchases made by users from e-commerce sites. These purchases can then be used to target advertisements to the user.

The above examples are not intended to be limiting and other use cases may exist.

Figure 7:
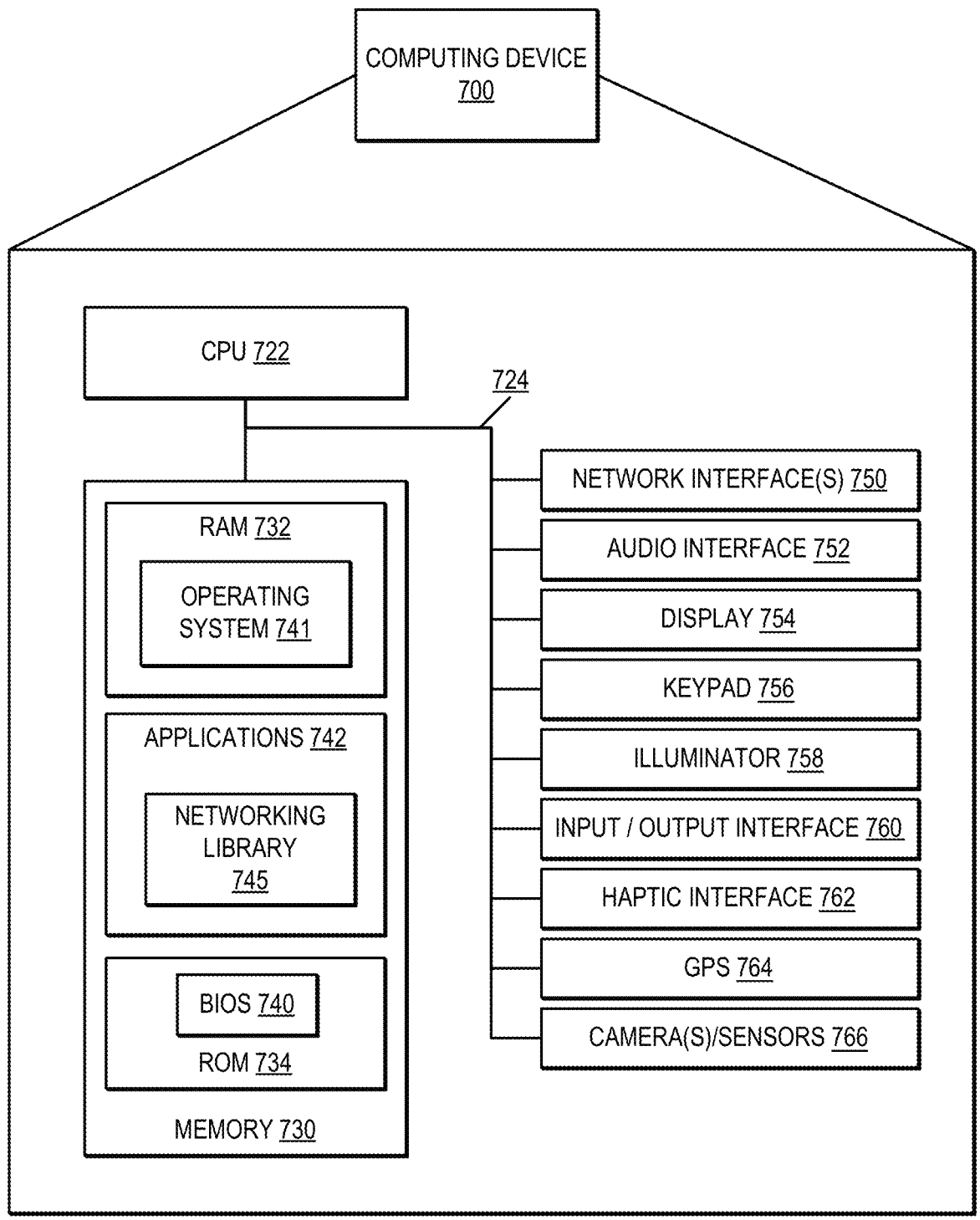
FIG. 7 is a schematic diagram illustrating a client device showing an example embodiment of a client or server device that may be used within the present disclosure.

FIG. 7 is a schematic diagram illustrating a client device showing an example embodiment of a client or server device that may be used within the present disclosure.

Computing device (700) may include more or fewer components than those shown in FIG. 7. For example, a server computing device may not include audio interfaces, displays, keypads, illuminators, haptic interfaces, GPS receivers and cameras or sensors.

As shown in the figure, device (700) includes a processing unit (CPU) (722) in communication with a mass memory (730) via a bus (724). Computing device (700) also includes one or more network interfaces (750), an audio interface (752), a display (754), a keypad (756), an illuminator (758), an input/output interface (760), a haptic interface (762), an optional global positioning systems (GPS) receiver (764) and a camera(s) or other optical, thermal, or electromagnetic sensors (766). Device (700) can include one camera/sensor (766), or a plurality of cameras/sensors (766), as understood by those of skill in the art. The positioning of the camera(s)/sensor(s) (766) on device (700) can change per device (700) model, per device (700) capabilities, and the like, or some combination thereof.

Computing device (700) may optionally communicate with a base station (not shown), or directly with another computing device. Network interface (750) is sometimes known as a transceiver, transceiving device, or network interface card (NIC).

Audio interface (752) is arranged to produce and receive audio signals such as the sound of a human voice. For example, audio interface (752) may be coupled to a speaker and microphone (not shown) to enable telecommunication with others and/or generate an audio acknowledgement for some action. Display (754) may be a liquid crystal display (LCD), gas plasma, light emitting diode (LED), or any other type of display used with a computing device. Display (754) may also include a touch sensitive screen arranged to receive input from an object such as a stylus or a digit from a human hand.

Keypad (756) may comprise any input device arranged to receive input from a user. Illuminator (758) may provide a status indication and/or provide light.

Computing device (700) also comprises input/output interface (760) for communicating with external. Input/ output interface (760) can utilize one or more communication technologies, such as USB, infrared, Bluetooth™, or the like. Haptic interface (762) is arranged to provide tactile feedback to a user of the client device.

Optional GPS transceiver (764) can determine the physical coordinates of computing device (700) on the surface of the Earth, which typically outputs a location as latitude and longitude values. GPS transceiver (764) can also employ other geo-positioning mechanisms, including, but not limited to, triangulation, assisted GPS (AGPS), E-OTD, CI, SAI, ETA, BSS, or the like, to further determine the physical location of computing device (700) on the surface of the Earth. In one embodiment, however, computing device may through other components, provide other information that may be employed to determine a physical location of the device, including for example, a MAC address, Internet Protocol (IP) address, or the like.

Mass memory (730) includes a RAM (732), a ROM (734), and other storage means. Mass memory (730) illustrates another example of computer storage media for storage of information such as computer readable instructions, data structures, program modules or other data. Mass memory (730) stores a basic input/output system ("BIOS") (740) for controlling low-level operation of computing device (700). The mass memory also stores an operating system (741) for controlling the operation of computing device (700).

Applications (742) may include computer executable instructions which, when executed by computing device (700), transmit, receive, and/or otherwise process network messages such as HTTPS messages. Applications (742) may further include networking library (745) that is configured to send, to receive, and/or to otherwise process network requests and responses. The device (700) can be configured to perform any of the methods (or portions of the methods) described previously in the description of the preceding Figures.

In some embodiments, the software and/or programs implementing the method embodiments can be read from hard disk drive (not illustrated) and temporarily stored in RAM (732) by CPU (722). CPU (722) may then read the software and/or data from RAM (732), process them, and store them to RAM (732) again.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium for execution by a processor. Modules may be integral to one or more servers, or be loaded and executed by one or more servers. One or more modules may be grouped into an engine or an application.

For the purposes of this disclosure the term "user", "subscriber" "consumer" or "customer" should be understood to refer to a user of an application or applications as described herein and/or a consumer of data supplied by a data provider. By way of example, and not limitation, the term "user" or "subscriber" can refer to a person who receives data provided by the data or service provider over the Internet in a browser session, or can refer to an automated software application which receives the data and stores or processes the data.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all the features described herein are possible.

Functionality may also be, in whole or in part, distributed among multiple components, in manners now known or to become known. Thus, myriad software/hardware/firmware combinations are possible in achieving the functions, features, interfaces, and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

What is claimed is:

1. A method comprising:
  intercepting an encrypted network request, the encrypted network request transmitted by a client device to a network endpoint to establish a secure session;
  identifying a network service associated with the network endpoint based on unencrypted properties of the encrypted network request, the encrypted network request comprising an encrypted portion and a plaintext portion, the unencrypted properties determined based on the plaintext portion;
  identifying an activity performed during the secure session by:
    capturing a series of subsequent encrypted network requests issued by the client device to the network endpoint during a transaction burst occurring during the secure session,
    generating a fingerprint based on the series of subsequent encrypted network requests, the fingerprint comprising at least one aggregated feature computed using properties of the series of subsequent encrypted network requests,
    inputting the fingerprint and an identification of the network service to a predictive model, the predictive model trained using transaction bursts by extracting one or more transaction properties from the transaction burst, assigning labels to the one or more transaction properties, a given label comprising one or more of a network service and an action, and training the predictive model with labeled data, and using an output of the predictive model as the activity; and updating a catalog of network interactions using the network service and the activity;

extracting a property from the encrypted network request; and updating a mapping using the property and the network service.

2. The method of claim 1, the identifying the network service comprising extracting a host and domain from a plaintext portion of a TLS handshake.

3. The method of claim 2, the extracting the host and domain from the plaintext portion of the TLS handshake comprising extracting the host and domain from a sever name identification extension field of a client hello issued during the TLS handshake.

4. The method of claim 1, the one or more transaction properties comprising a property selected from the group consisting of: a transmission control protocol (TCP) port; an Internet Protocol (IP) address space; a size of a datagram; a response time; a number of requests in the transaction burst; and a network route trace.

5. The method of claim 1, further comprising:

extracting an IP address from encrypted network request; and updating a mapping using the IP address and the network service, the mapping comprising a mapping of IP addresses to network services.

6. The method of claim 1, wherein the property is selected from the group consisting of response size, response time, network route, and uniform resource identifier (URI) header length.

7. A non-transitory computer readable storage medium for tangibly storing computer program instructions capable of being executed by a computer processor, the computer program instructions defining steps of:

intercepting an encrypted network request, the encrypted network request transmitted by a client device to a network endpoint to establish a secure session;

identifying a network service associated with the network endpoint based on unencrypted properties of the encrypted network request, the encrypted network request comprising an encrypted portion and a plaintext portion, the unencrypted properties determined based on the plaintext portion;

identifying an activity performed during the secure session by:

capturing a series of subsequent encrypted network requests issued by the client device to the network endpoint during a transaction burst occurring during the secure session, generating a fingerprint based on the series of subsequent encrypted network requests, the fingerprint comprising at least one aggregated feature computed using properties of the series of subsequent encrypted network requests, inputting the fingerprint and an identification of the network service to a predictive model, the predictive model trained using transaction bursts by extracting one or more transaction properties from the transaction burst, assigning labels to the one or more transaction properties, a given label comprising one or more of a network service and an action, and training the predictive model with labeled data, and using an output of the predictive model as the activity; and updating a catalog of network interactions using the network service and the activity;

extracting a property from the encrypted network request; and updating a mapping using the property and the network service.

8. The non-transitory computer readable storage medium of claim 7, the identifying the network service comprising extracting a host and domain from a plaintext portion of a TLS handshake.

9. The non-transitory computer readable storage medium of claim 8, the extracting the host and domain from the plaintext portion of the TLS handshake comprising extracting the host and domain from a sever name identification extension field of a client hello issued during the TLS handshake.

10. The non-transitory computer readable storage medium of claim 7, the one or more transaction properties comprising a property selected from the group consisting of: a transmission control protocol (TCP) port; an Internet Protocol (IP) address space; a size of a datagram; a response time; a number of requests in the transaction burst; and a network route trace.

11. The non-transitory computer readable storage medium of claim 7, the computer program instructions further defining the steps of:

extracting an IP address from encrypted network request; and updating a mapping using the IP address and the network service, the mapping comprising a mapping of IP addresses to network services.

12. The non-transitory computer readable storage medium of claim 7, wherein the property is selected from the group consisting of response size, response time, network route, and uniform resource identifier (URI) header length.

13. A device comprising:

a processor; and a storage medium for tangibly storing thereon program logic for execution by the processor, the stored program logic causing the processor to perform operations of:

intercepting an encrypted network request, the encrypted network request transmitted by a client device to a network endpoint to establish a secure session, identifying a network service associated with the network endpoint based on unencrypted properties of the encrypted network request, the encrypted network request comprising an encrypted portion and a plaintext portion, the unencrypted properties determined based on the plaintext portion, identifying an activity performed during the secure session by:

capturing a series of subsequent encrypted network requests issued by the client device to the network endpoint during a transaction burst occurring during the secure session, generating a fingerprint based on the series of subsequent encrypted network requests, the fingerprint comprising at least one aggregated feature computed using properties of the series of subsequent encrypted network requests, inputting the fingerprint and an identification of the network service to a predictive model, the predictive model trained using transaction bursts by extracting one or more transaction properties from the transaction burst, assigning labels to the one or more transaction properties, a given label comprising one or more of a network service and an action, and training the predictive model with labeled data, and using an output of the predictive model as the activity, and updating a catalog of network interactions using the network service and the activity, extracting a property from the encrypted network request, and updating a mapping using the property and the network service.

14. The device of claim 13, the identifying the network service comprising extracting a host and domain from a plaintext portion of a TLS handshake.

15. The device of claim 13, the one or more transaction properties comprising a property selected from the group consisting of: a transmission control protocol (TCP) port; an Internet Protocol (IP) address space; a size of a datagram; a response time; a number of requests in the transaction burst; and a network route trace.

16. The device of claim 13, stored program logic further causing the processor to perform the operations of:

extracting an IP address from encrypted network request; and updating a mapping using the IP address and the network service, the mapping comprising a mapping of IP addresses to network services.

17. The device of claim 13, wherein the property is selected from the group consisting of response size, response time, network route, and uniform resource identifier (URI) header length; and updating a mapping using the property and the network service, the mapping comprising a mapping of properties to network services.

18. The method of claim 1, wherein the mapping comprises a mapping of properties to network services.

19. The non-transitory computer readable storage medium of claim 7, wherein the mapping comprises a mapping of properties to network services.

20. The device of claim 13, wherein the mapping comprises a mapping of properties to network services.

\* \* \* \* \*